No. 875,251. PATENTED DEC. 31, 1907.
J. F. FIELD.
FOLDING JOINT FOR SCHOOL DESKS.
APPLICATION FILED MAR. 11, 1907.
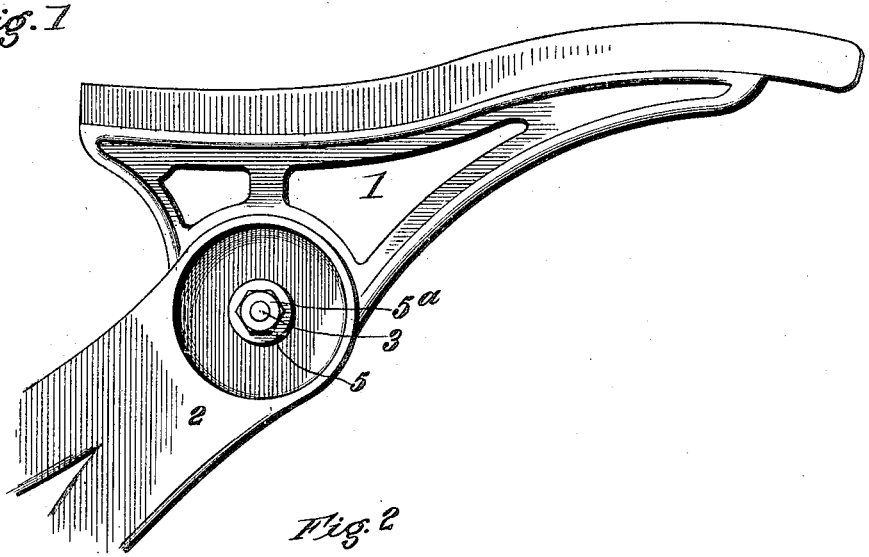
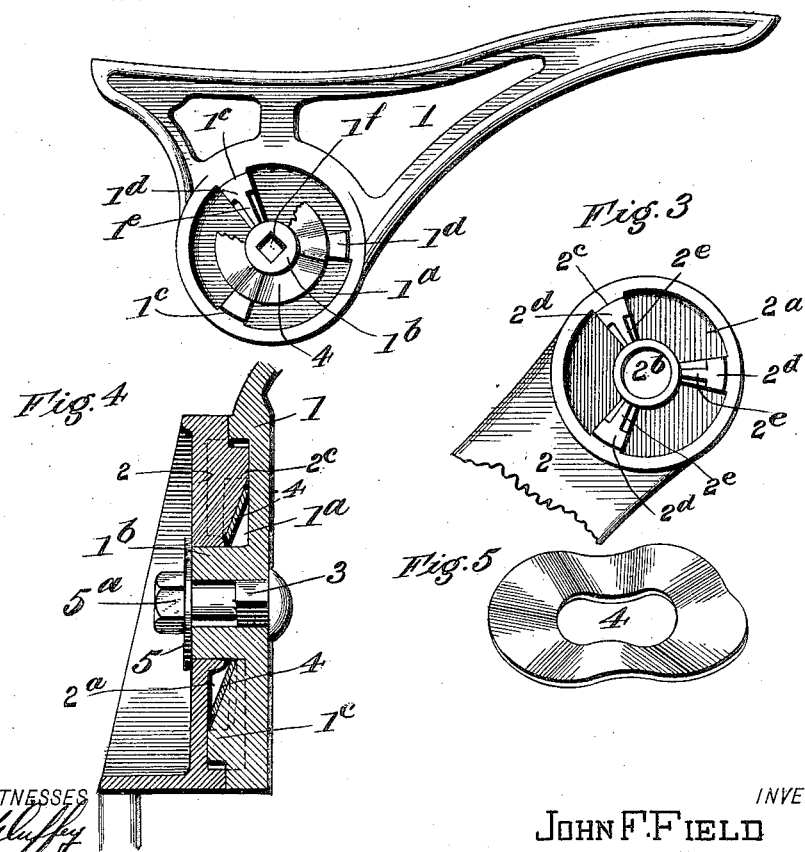
WITNESSES
INVENTOR
JOHN F. FIELD
BY
ATTORNEYS

UNITED STATES PATENT OFFICE.

JOHN FRANKLIN FIELD, OF IONIA, MICHIGAN, ASSIGNOR TO E. H. STAFFORD MANUFACTURING COMPANY, OF IONIA, MICHIGAN, A CORPORATION OF ILLINOIS.

FOLDING JOINT FOR SCHOOL-DESKS.

No. 875,251.     Specification of Letters Patent.     Patented Dec. 31, 1907.

Application filed March 11, 1907. Serial No. 361,751.

*To all whom it may concern:*

Be it known that I, JOHN FRANKLIN FIELD, of Ionia, in the county of Ionia and State of Michigan, have invented certain new and useful Improvements in Folding Joints for School-Desks; and I hereby declare that the following is a full, clear, and exact description thereof, reference being had to the accompanying drawings, which form part of this specification.

This invention is an improvement in metal joints, and is a noiseless joint or hinge connection particularly designed for use in school furniture to connect the folding seats to the standards of a desk or chair; but it is obviously applicable to other articles and uses in the arts, and therefore I do not restrict myself to the particular application thereof specified herein.

Customarily the school desk seats are hinged to the standards in such manner that they can be thrown up out of the way, and lowered into working position, and the joints are made with stops to arrest the seat in the desired positions. A great deal of annoyance is caused by the friction of the joints, and by the noise caused by the impact of the joint-stops when the seats are raised or lowered; and the particular object of the present invention is to obviate these annoyances by making the hinge-joints in such manner that while the seat can be raised and lowered readily and without hindrance, it will be noiseless. I also dispense with leather, rubber and like other anti-friction or deadening materials which are effective while new but speedily wear out and become worthless. I provide an all metal joint, and obtain the desired objects in a simple but effective manner by the construction hereinafter described, and which is illustrated in the accompanying drawings; and the claims summarize the features of the invention for which I desire protection.

In the drawings—Figure 1 is a detail side view of part of a school-desk-seat, showing the external appearance of the joint. Fig. 2 is a view of the seat-member of the joint, detached, with the buffer-ring or washer in place but partly broken away. Fig. 3 is an inner face view of the standard-member of the joint detached. Fig. 4 is an enlarged section through the joint. Fig. 5 is a detail view of the buffer-ring or washer.

The seat member 1 is provided with a shallow circular recess $1^a$ in one face, from the center of which projects a horizontal journal stud $1^b$ adapted to support the seat-member upon the standard, said stud $1^b$ being axially perforated for the passage of a bolt 3. Within the recess $1^a$ and radiating from the stud $1^b$ are a number of radially disposed ribs $1^c$ having enlarged projecting heads $1^d$ on their outer ends, and inwardly tapered parts $1^e$ on their outer faces.

The standard 2 may be part of the side frame of a desk or chair and is provided with a hinge portion having a shallow circular recess $2^a$ in one face corresponding with, but opposed to, the recess $1^a$ in part 1; and it has a central aperture $2^b$ adapted to receive the stud $1^b$; and from this aperture radiate ribs $2^c$ having enlarged heads $2^d$ at their outer ends, and inwardly tapered parts $2^e$ on their outer faces, as shown. The ribs $2^c$ correspond in number and form to ribs $1^c$, but when the seat-member is fitted to the standard as in Figs. 1 and 4, with the recessed faces opposed and stud $1^b$ entered into aperture $2^b$, the ribs $2^c$ alternate with the ribs $1^c$, and the heads $1^d$, $2^d$, form stops to limit the swinging movement of the seat on the standard.

In order to prevent friction and noise, an undulated buffer-ring or washer 4 (preferably made of soft steel spring metal) is placed on stud $1^b$ intermediate the ribs $1^c$, $2^c$, and bears against the tapered parts $1^e$, $2^e$, which press against the opposite faces thereof, at different points. The result is that as the ribs $1^c$, $2^c$, approach each other the spring buffer acts with increasing force and practically arrests the movement of the parts just before the stops $1^d$, $2^d$, contact (although the latter may contact when the occupant is seated) and thus the noise of impact of the stops is obviated, and while the seat has the desired freedom of movement, it cannot be "banged" up or down in an annoying manner, but is practically noiseless under all conditions.

The buffer ring 4 is not stationary with either part but is free to work with either or both, and is used to produce an increasing side tension or "retard" on the motion of the hinge when nearing the stops, for instance when the seat arm is in a neutral position the buffer ring has six equidistant points of contact, three ribs on one side and three on the other; the three ribs from each side projecting inward beyond the center line about the thickness of the buffer ring. If the seat arm is moved up or down the three ribs on one side approach those on the other side and the buffer ring is pinched between the approaching ribs, the nearer they come together the sharper the angles become and the tension on the buffer ring is correspondingly increased and the motion is retarded sufficiently to prevent any shock or noise when the outer stops come together.

The parts of the hinge-joint are held together by means of the bolt 3 passed through an angular aperture $1^f$ in the stud $1^b$, and through washer 5 fitted against the seat-member. The bolt is secured by means of a nut $5^a$ on its threaded end, as shown in Fig. 4.

By tightening nut $5^a$ the pressure on the buffer-washer can be regulated and increased as desired to compensate for any slight wear or weakening of the washer.

By the described construction an easily operated, noiseless joint is obtained, and it is obvious that such joint can be used in many other structures where noiseless, easy joints are desired.

Having described my invention what I claim is:

1. In a hinge-joint, the combination of opposite members having radially disposed ribs on their opposed faces, the ribs on the members alternating in position; a buffer-ring interposed between the ribs of the opposed members, and means for holding the ribs in contact with the buffer ring.

2. In a hinge-joint, the combination of a member having a journal stud, and ribs radiating from the stud, an opposed member having radial ribs, and a central aperture to accommodate the stud of the first member, and a buffer-ring interposed between the opposed members and engaged by the ribs thereof.

3. In a hinge-joint, the combination of opposed members, radially disposed ribs on each member provided with enlarged heads or stops on their outer ends and with tapering parts on their inner faces, a buffer-washer interposed between the members and pressed by the ribs; a bolt transfixing the members, and a securing nut on the end of the bolt.

4. In a hinge-joint, the combination of opposite members having radially disposed ribs on their opposed faces, the ribs on the members alternating in position; a stud on one member engaging a corresponding aperture in the other member, a buffer-ring or washer interposed between the ribs of the opposed members, and means for holding the members in contact with the washer, substantially as described.

5. In a hinge-joint, the combination of opposed members, an axial stud on one member engaged by a corresponding aperture on the other member, radially disposed ribs on each member provided with enlarged heads or stops on their outer ends and with inclined ribs on their inner faces, a buffer-washer interposed between the members and pressed by the ribs; a bolt transfixing the stud, and a securing nut on the end of the bolt, substantially as and for the purpose described.

6. In a hinge-joint, the combination of a member having a recess, a journal stud therein, ribs radiating from the stud within the recess, and an opposed member having a recess, radial ribs therein, and a central aperture to accommodate the stud of the first member; with a buffer-ring interposed between the opposed members and engaged by the ribs thereof.

7. In a hinge-joint, the combination of opposite members having corresponding circular recesses on their opposed faces, and radially disposed ribs in said recesses, the ribs on the members alternating in position; a stud on one member engaging a corresponding aperture on the other member, a buffer-ring or washer interposed between the ribs of the opposed members, and means for holding the members in contact with the washer, substantially as described.

8. In a hinge-joint, the combination of the seat and standard members having circular recesses in their opposed faces, an axial stud on one member engaging a corresponding aperture in the other member, radially disposed ribs in the recesses provided with enlarged heads or stops on their outer ends and with tapered parts on their inner faces, a metallic undulated buffer-washer interposed between the members and pressed by the ribs; a bolt transfixing the stud, and a washer engaged by the bolt, substantially as set forth.

In testimony that I claim the foregoing as my own, I affix my signature in presence of two witnesses.

JOHN FRANKLIN FIELD.

Witnesses:
   WINNIE FREEMAN,
   LAURENCE W. SMITH.